(12) United States Patent
Brachos et al.

(10) Patent No.: US 8,161,851 B1
(45) Date of Patent: Apr. 24, 2012

(54) COMPOSITE TRIMMING PROCESS

(75) Inventors: Vasilios Brachos, North Andover, MA (US); Vincent Borbone, Sandown, NH (US); Paul Crowther, Bradford, MA (US)

(73) Assignee: Ceradyne, Inc., Costa Mesa, CA (US)

( * ) Notice: Subject to any disclaimer, the term of this patent is extended or adjusted under 35 U.S.C. 154(b) by 447 days.

(21) Appl. No.: 12/415,393

(22) Filed: Mar. 31, 2009

Related U.S. Application Data

(60) Provisional application No. 61/041,221, filed on Mar. 31, 2008.

(51) Int. Cl.
B23Q 11/14 (2006.01)
B23Q 11/00 (2006.01)

(52) U.S. Cl. .......................................... 82/1.11; 82/50

(58) Field of Classification Search ............... 82/1.11, 82/50; 407/11; 408/56, 57, 61; 184/6.14; 62/92.1; 451/7, 449; 264/161, 162, 138
See application file for complete search history.

(56) References Cited

U.S. PATENT DOCUMENTS

| | | | | |
|---|---|---|---|---|
| 2,635,399 A | * | 4/1953 | West, Jr. ........................ | 451/53 |
| 3,077,802 A | * | 2/1963 | Philip ............................ | 82/173 |
| 3,164,933 A | * | 1/1965 | Labowsky ..................... | 451/548 |
| 5,331,073 A | | 7/1994 | Weinschenk, III et al. | |
| 5,609,802 A | * | 3/1997 | Jeng ............................ | 264/46.5 |
| 6,219,849 B1 | * | 4/2001 | Crescentini .................... | 2/412 |
| 6,446,270 B1 | * | 9/2002 | Durr ............................. | 2/412 |
| 6,572,572 B2 | * | 6/2003 | Pomatto et al. ............... | 602/17 |
| 6,610,221 B2 | | 8/2003 | Bawa et al. | |
| 6,669,532 B1 | * | 12/2003 | Mukai et al. .................. | 451/7 |
| 6,893,126 B2 | * | 5/2005 | Iori et al. ...................... | 351/159 |
| 7,067,602 B2 | | 6/2006 | Benz et al. | |
| 7,234,224 B1 | | 6/2007 | Naugler et al. | |
| 7,310,955 B2 | | 12/2007 | Hume et al. | |
| 7,823,487 B2 | * | 11/2010 | Steiner ......................... | 82/50 |
| 2004/0021247 A1 | * | 2/2004 | Habisreitinger et al. ..... | 264/161 |
| 2004/0256770 A1 | * | 12/2004 | Padgett et al. ............... | 264/544 |
| 2009/0320655 A1 | * | 12/2009 | Grant ........................... | 82/50 |

OTHER PUBLICATIONS

Bhattacharyya, et al., Abstract of Cryogenic machining of Kevlar composites, Dec. 1-6, 1991, 1 page, http://adsabs.harvard.edu/abs/1991pmcm.proc., Internet date Mar. 25, 2008.

* cited by examiner

*Primary Examiner* — Will Fridie, Jr.
(74) *Attorney, Agent, or Firm* — Grossman Tucker Perreault & Pfleger PLLC

(57) ABSTRACT

A method and device for trimming components may include mounting a component in a fixture and providing a cutting tool having a cutting portion, wherein the cutting tool is displaceable in at least three axes relative to the fixture. Gas may be supplied through a supply tube to the cutting portion of the cutting tool and the supply tube may be cooled to a first temperature. The component may be cut with the cutting tool while supplying gas to the component.

6 Claims, 9 Drawing Sheets

COMPOSITE TRIMMING PROCESS

CROSS REFERENCES TO RELATED APPLICATIONS

The present application claims the benefit of the filing date of U.S. Provisional Application Ser. No. 61/041,221, filed on Mar. 31, 2008, the teachings of which are incorporated herein by reference.

FIELD OF THE INVENTION

The present disclosure relates to a process for trimming or cutting a composite material and, in particular, composite materials including fibers having a tenacity of greater than 15 grams per denier.

BACKGROUND

Composite materials may be used in a number of applications. Composite structures may be understood as relatively solid materials or structures that may be composed of one or more substances, wherein the various substances may impart different properties to the composite. While composite structure may provide greatly improved properties, machining composites may be relatively difficult depending on the materials included in the composite structure. For example, materials having a tenacity of greater than 15 grams per denier may be difficult to cut as such materials may pull or stretch instead of cut cleanly or shear. Thus, in making composites, such as ballistic helmets, some may try to form the composite into a final shape and eliminate the need to trim the composite. However, as the tool may be configured to provide only a single final shape, the number of applications for which the tooling be used for is limited to only a single application.

SUMMARY OF THE INVENTION

An aspect of the present disclosure relates to a method for trimming components. The method may include mounting a component in a fixture and providing a cutting tool having a cutting portion, wherein the cutting tool is displaceable in at least three axes relative to the fixture. The method may also include supplying gas through a supply tube to the cutting portion of the cutting tool and cooling the supply tube to a first temperature in the range of −90° F. to −125° F. The component may then be cut with the cutting tool while supplying the gas to the component.

Another aspect of the present disclosure relates to a device for trimming a component. The device may include a fixture configured to support the component, wherein a first portion of the fixture may be mounted on a drive and may be rotatable around a first axis and a second portion of the fixture may rotate with the first portion of the fixture and may be displacable along the first axis with respect to the first portion of the fixture. The device may also include a cutting tool, which is displaceable in at least 3 axes relative to the fixture by at least one motor, and a programmable controller, wherein the controller communicates to the at least one motor and provides a cutting path. The first and second portions of the fixture may extend within 4 cm or less of the cutting path. The device may also include a liquid gas supply tube displaceable with the cutting tool, wherein the device is configured to cut a composite material including at least 50% of fiber having a tenacity of greater than 15 grams per denier at a rate of 7 mm per second.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION

Figure 1A:
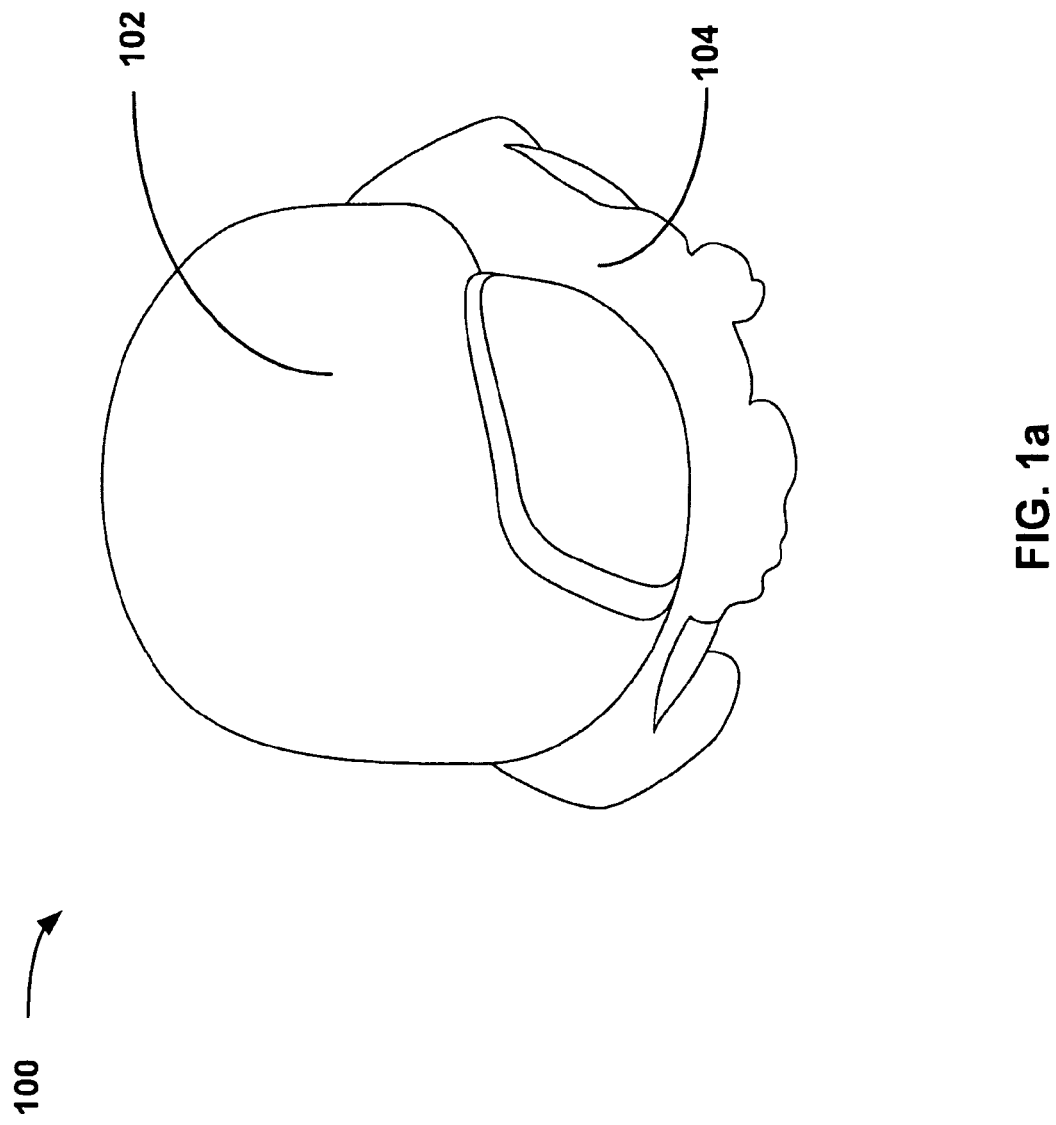
FIG. 1a illustrates an example of a composite having a near net shape.

It is to be understood that this disclosure is not limited in its application to the details of construction and the arrangement of components set forth in the following description or illustrated in the drawings. The embodiments herein are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

The present disclosure relates to a process for trimming or cutting a ballistic composite. In one example, the ballistic composite may include helmets; however, other composites may be produced as well, including plates. Furthermore, the composite structures may be used in applications other than ballistics, such as safety equipment, construction materials, etc. A composite may be understood herein as including one or more materials. In one example, a single material may be included in the composite, which is oriented in different directions, providing different properties in each direction. In another example, the composite material may include a first material exhibiting a first set of properties and a second material including a second set of properties.

In one example, prior to trimming, a composite may be provided having a near net shape. A near net shape may be understood as when a portion of the composite has been formed into a final geometry and another portion of the composite may need to be trimmed or cut to reach a final geometry. Once a final overall geometry has been obtained in each portion, further finishing operations may be provided, such as machining holes for affixing straps or ventilation, or providing a finishing strip around a rim. Thus, it may be appreciated other features may be added to the final geometry, but the basic overall shape may remain the same.

Figure 1B:
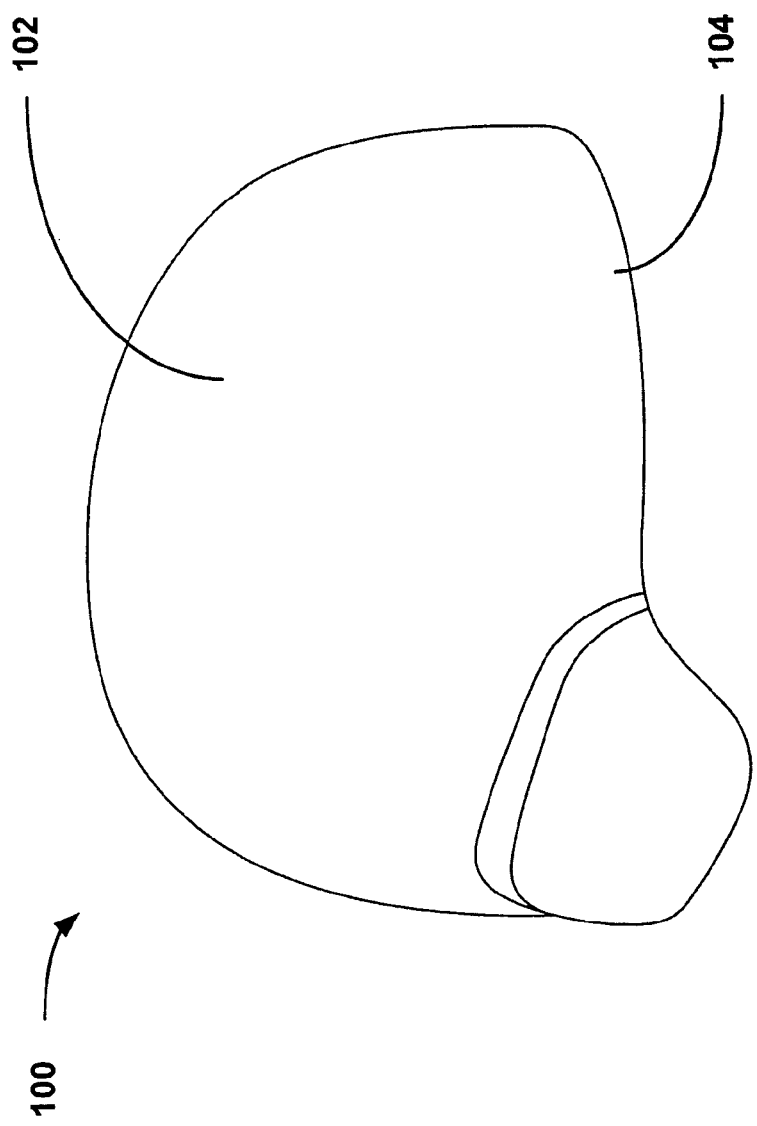
FIG. 1b illustrates an example of a composite having a net shape.

For example, FIG. 1a illustrates a composite helmet provided with a near net shape. The dome 102 of the helmet 100 in FIG. 1a is illustrated as having a final geometry, whereas the rim 104 of the helmet does not exhibit a final geometry and needs to be trimmed to reach its final geometry. As may be appreciated, the helmet may be trimmed in a number of ways to provide helmets for different applications. An example of a composite helmet 100 with a final overall geometry and having a net shape is illustrated in FIG. 1b. As illustrated, the dome of the helmet 102 remains substantially the same; however, the rim 104 has been trimmed to a final geometry or net shape. The helmet may now be ready for other finishing processes, such as drilling holes for straps or ventilation. It may be appreciated that by trimming or cutting the composite structure, a single mold may be used to form helmets to accommodate a number of applications and final geometries.

The composite may also include relatively high tenacity fibers. For example, the composite may be formed of 50% by weight or more, including all values and increments in the range of 50% to 100% by weight, of relatively high tenacity fibers, which may be understood as fibers having a tenacity of 15 grams per denier or greater, including all values and increments therein. In one example, the fibers may have a tenacity in the range of 20 gram per denier to 40 grams per denier. Furthermore, the composite fibers may be made of carbon fiber or thermoplastic fiber, such as para-aramid fibers, including KEVLAR fiber available from DuPont; or ultrahigh molecular weight polyethylene fibers, such as DYNEEMA fiber available from DSM or SPECTRA fiber available from Honeywell; and/or LCP and/or aromatic PET fibers, including VECTRAN fiber available from Kuraray America, Inc.

The composite may also include a thermoplastic resin. The thermoplastic resin may include a polyolefin such as polypropylene (PP) or polyethylene (PE), thermoplastic olefins (TPO), etc. as well as material blends. In addition, the composite may also include an adhesive, such as acrylic, epoxies, polyurethane, silicone, etc.

The composite may be trimmed by a machine or device capable of cutting the composite along one or more paths in multiple axes. In one example, the composite may be trimmed by a lathe having a cutting tool mounted thereon, capable of being displaced in at least three axes, for example the x-axis, y-axis and z-axis. However, other milling machines may be used, including those having 4 or 5 axes and configured to provide horizontal or vertical machining or milling.

Figure 2:
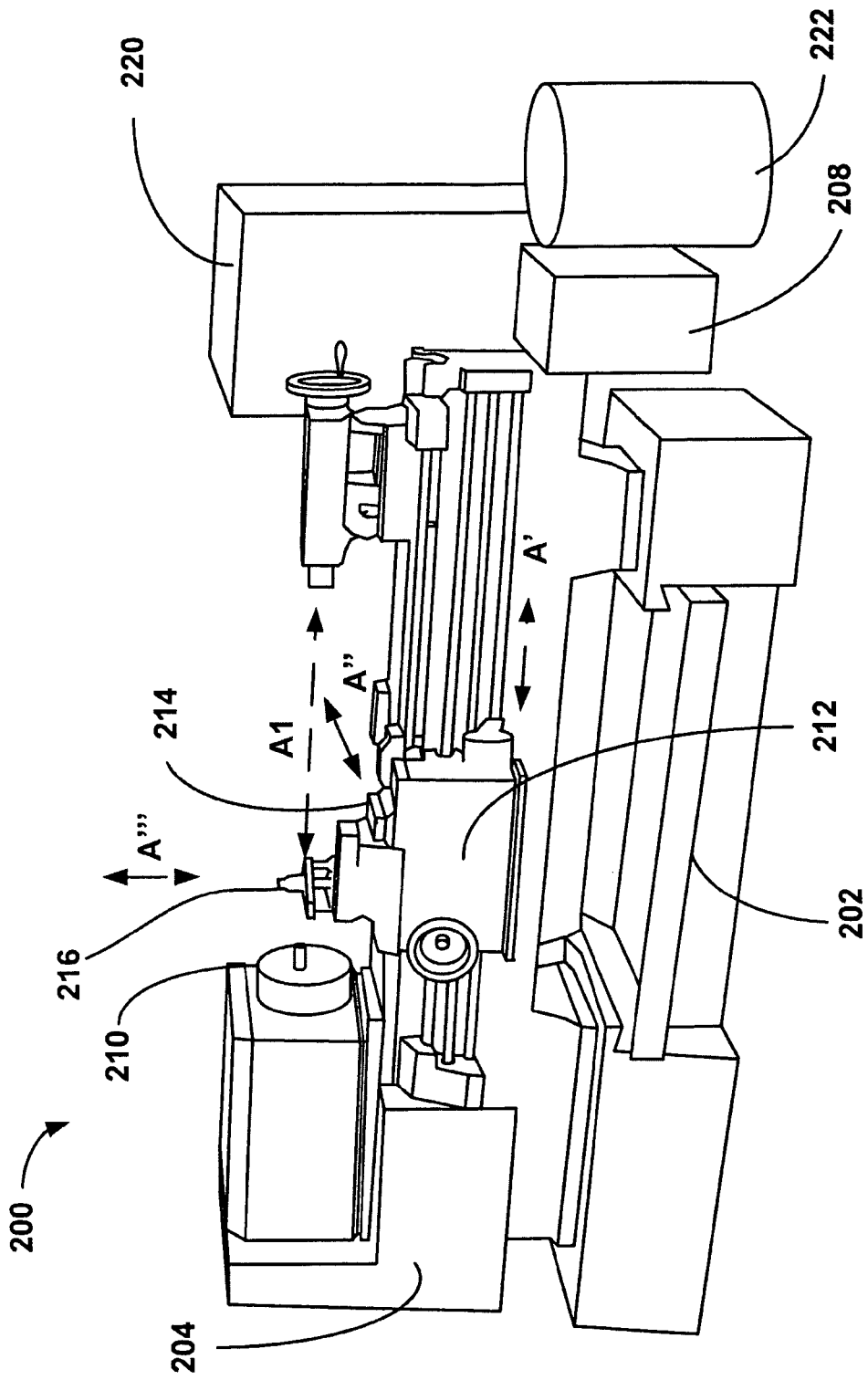
FIG. 2 illustrates an example of a cutting device.

FIG. 2 illustrates an exemplary cutting device. The cutting device 200 may include a base 202 from which a drive 204, cutting tool mount 206, and a junction box 208 may be positioned. The base 202 may be any geometry, and as illustrated is a lathe. The base 202 may include a waste bin or a vacuum mount for mounting a vacuum or other air cleaning device thereon to catch any shavings or scraps.

The drive 204 may include one or more motors for positioning the component. The component may be rotated or positioned along a number of axes. In one example, a drive spindle 210 may be used to connect the drive to a fixture or the component, in another example, a plate may be used to connect the drive to a fixture or the component. The drive spindle 210 or plate may be rotated by the drive motor to provide rotation of the fixture and/or component around a first axis A1 as the component is being trimmed. Speed or rotational velocity may be adjusted in the range of 1 mm/s to up to 20 mm/s including all values and increments therein.

A cutting tool may be mounted and secured in the cutting tool mount 206. The cutting tool and/or mount may be adjusted with respect to the drive spindle and/or fixture via a series of slides. The base may include a first slide 212 for positioning the cutting tool mount 206 along a first axis A' relative to the drive spindle, plate and/or fixture. The cutting tool mount may include a second slide 214 for positioning the cutting tool mount or the cutting tool along a second axis A" relative to the drive spindle, plate and/or fixture. In addition, a third slide 216 may be provided for positioning the cutting tool and/or cutting tool mount around a third axis A''' relative to the drive spindle, plate and/or fixture. Motors, such as servo-motors may be utilized to adjust the position of the cutting tool and/or cutting tool mount relative to the drive along the various slides. In addition, in one example, the cutting tool mount may automatically release and secure cutting tools and may automatically interchange cutting tools when desired.

Figure 3:
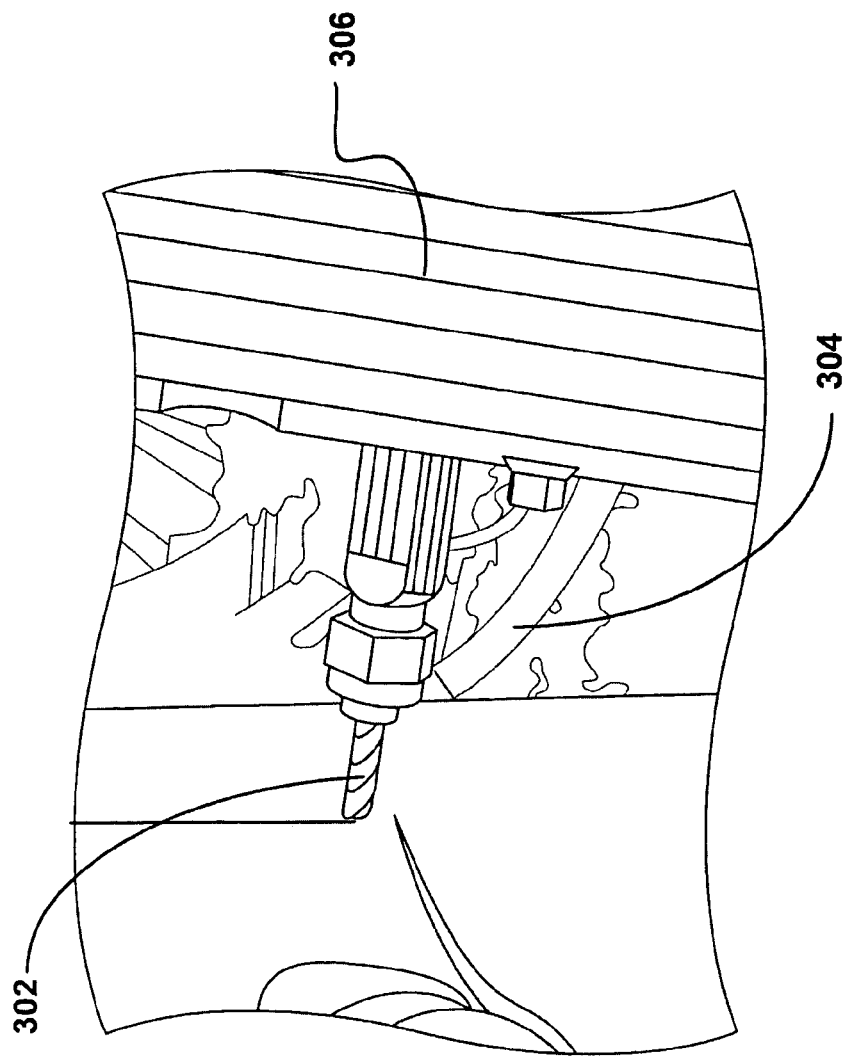
FIG. 3 illustrates an example of a cutting tool and a $CO_2$ supply tube mounted on a cutting tool mount.

The cutting tool used herein, illustrated in FIG. 3, may include a multi-fluted cutting bit. The cutting bit 302 may be, for example, hardened steel or carbide. In addition, the cutting area of the cutting tool may be hardened or include a coating imparting hardness. In one example, a diamond, diamond like or polycrystalline diamond coating may be provided on the cutting area of the tool.

Referring back to FIG. 2, the junction box 208 may provide for power and/or controller input. The controller input may include communication to a computer or other device 220 that may provide computer numerical control (CNC). In one example, the controller may store a number of cutting paths, which may be chosen by a selector switch. In another example, the controller may include software, hardware or firmware for reading CAD/CAM files and providing cutting paths utilizing such files. It may be appreciated that the various motors for controlling movement of the component and/or tool during trimming may be controlled by the CNC.

Figure 4:
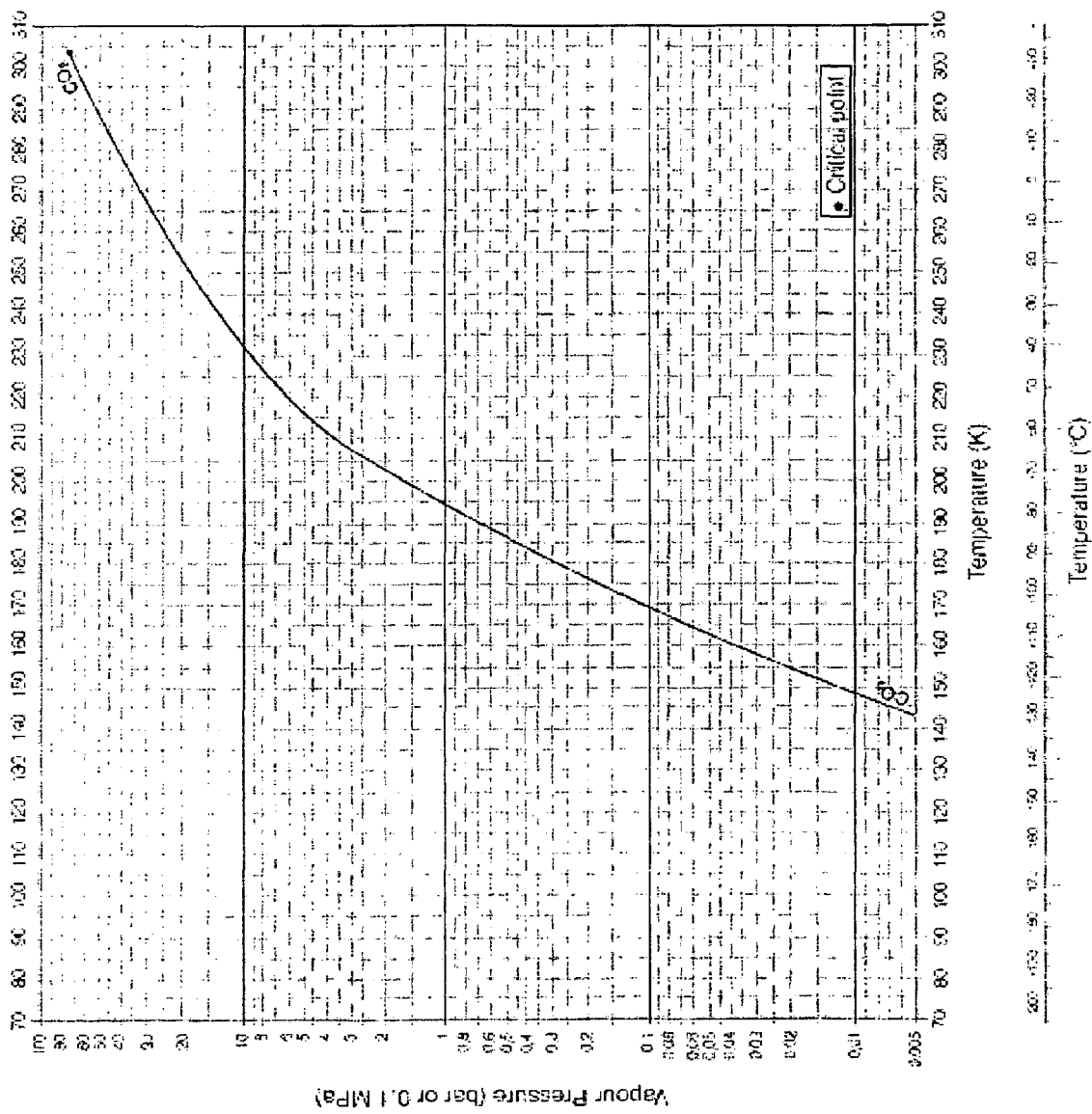
FIG. 4 is an example of a plot of temperature versus vapor pressure for $CO_2$.

A liquid gas cylinder 222 may also be included. The liquid gas cylinder may include, for example liquid $CO_2$. Referring again to FIG. 3, the liquid may be used to deliver cold gas by a gas supply tube 304 mounted on the cutting tool mount 306. In one example, illustrated in FIG. 4, liquid $CO_2$ may transform into gas at approximately $-115°$ F. when introduced to atmospheric pressure. To provide the $CO_2$ gas, a jet nozzle may be used to separate the liquid feed line from the gas supply tube. The liquid in the feed line may exhibit a temperature between 0° F. and $-50°$ F., depending on the tank and line pressure. As soon as the liquid flows through the jet, the liquid may expand and evaporate to reach a temperature in the range of $-90°$ F. to $-125°$ F. As may be appreciated, other gasses exhibiting similar physical properties may be used as well, such as gasses exhibiting similar critical points.

The gas may be delivered in an area proximate to the cutting portion of the cutting tool, such that when the cutting tool enters the composite, both the composite and the cutting tool may be impinged by the $CO_2$ gas. It may be appreciated that the entire composite need not be cooled. A thermocouple (not illustrated) may be present in the gas supply tube 304 (illustrated in FIG. 3) for monitoring the temperature of the supply tube. Prior to cutting, the supply tube may be brought down to a temperature of about $-90°$ F. or less, including all values and increments in the range of $-90°$ F. to $-125°$ F. The temperature may be maintained throughout cutting by, for example, adjusting the gas supply rate. In another example, the gas may be fed through the tube at a relatively constant rate during the cutting process.

As alluded to above, a fixture may be provided to support and or retain the component. For example, the fixture may be mounted in connection with a drive, such as a drive spindle (illustrated in FIG. 2). The fixture may include one or more portions that may or may not mate. The fixture, or fixture portions, may assume a shape consistent with at least a portion of the composite shape.

Figure 5B:
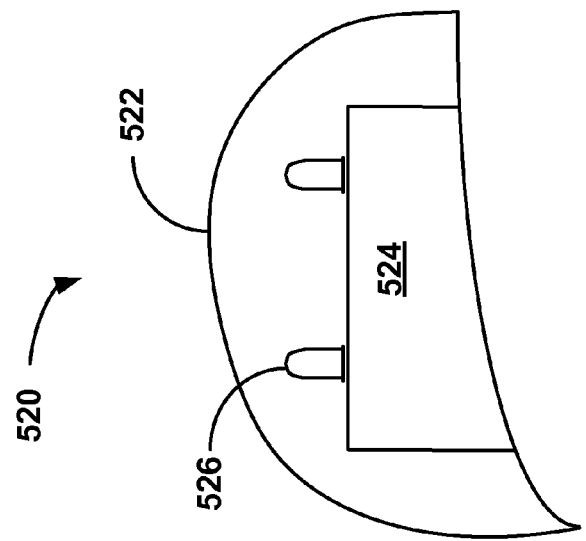
FIG. 5b is a cross-sectional view of an example of a second fixture.
Figure 5A:
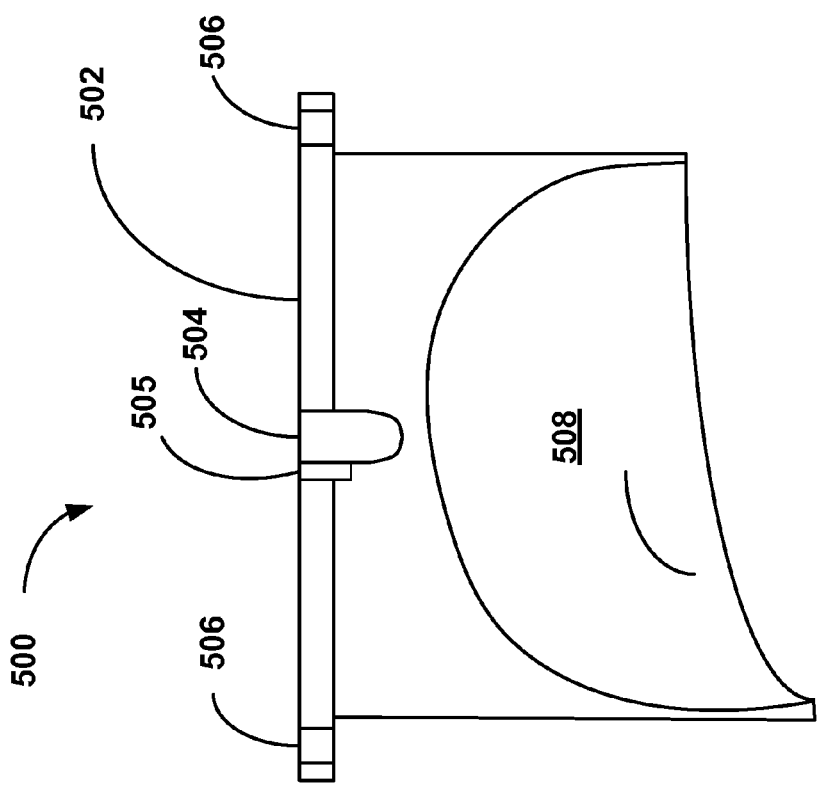
FIG. 5a is a cross-sectional view of an example of a first fixture.

An example of a first portion of a fixture is illustrated in FIG. 5a, which is a cross-sectional view of a fixture. The fixture 500 may include a base section 502. The base section may include a through-hole 504 for receiving a drive spindle. The drive spindle and through-hole may be keyed (i.e., including a key slot 505), such that the drive spindle includes a projection from the spindle to be received in the key slot 505 and that as the drive spindle rotates, the fixture rotates with the spindle. In another example, a number of through-holes 506 may be positioned in base section 502 for receiving screws, bolts or other attachment features that may affix the base section 502 to the drive of the cutting machine. The fixture may include a cavity 508 defined therein for receiving at least a portion of one surface the composite to be trimmed. As illustrated, the cavity may be in the general shape of the exterior of the helmet. It may be appreciated that while the fixture appears to be solid as illustrated, the fixture may be hollow or include other internal supports.

An example of a second portion of a fixture is illustrated in FIG. 5b, which is a cross-sectional view of a fixture. The second fixture portion 520 may include an exterior surface 522, which may be in the general shape of at least a portion of one surface of the composite to be trimmed. As illustrated, the exterior surface may be in the general shape of the inside of a helmet. The fixture may include a bore 524 for receiving a freely rotating clamping device that may be configured to move along axis A1 (see FIG. 2) relative to the drive and/or first fixture. In addition, one or more recesses 526 at the base of the bore may be provided in the fixture for receiving pins extending from the clamping device. Sufficient pressure may be applied by the clamping device and/or fixture to retain the composite within the fixture.

Figure 6A:
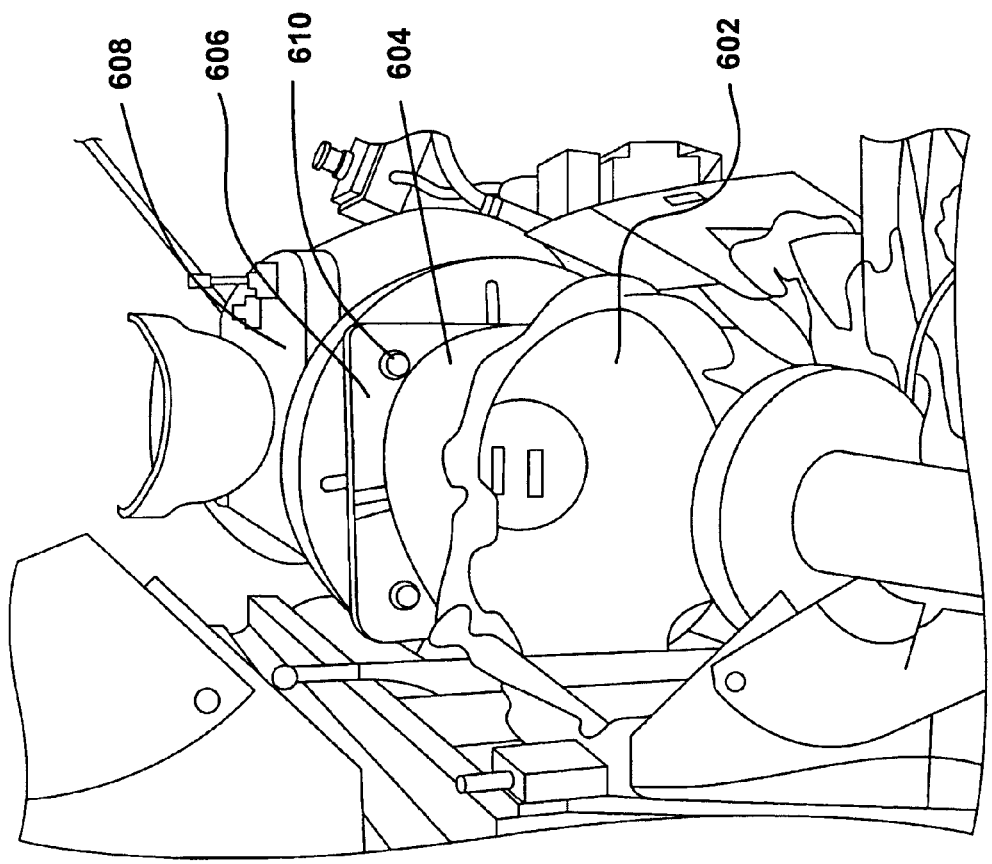
FIG. 6a is an example of a composite being mounted into a first fixture in a cutting device.
Figure 6B:
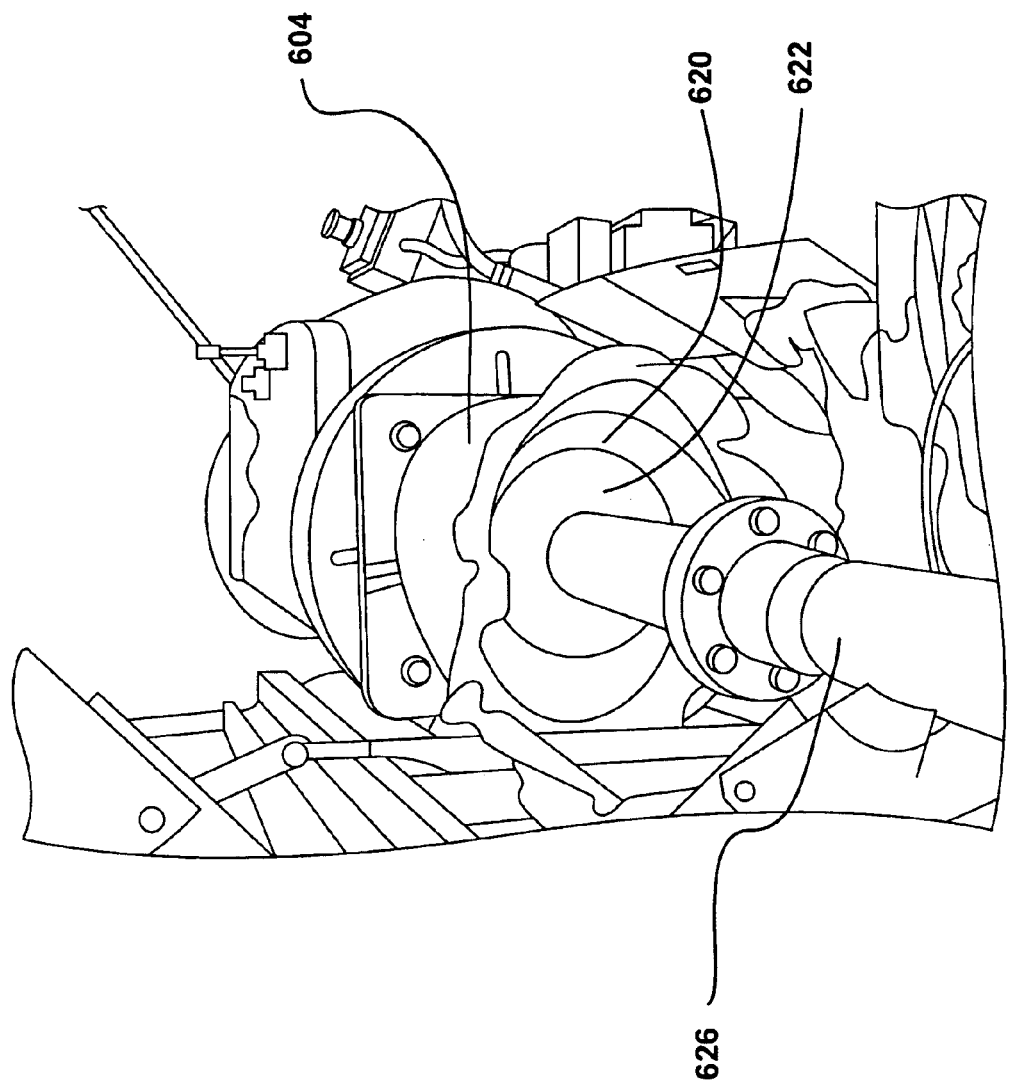
FIG. 6b is an example of a second fixture being mounted to the composite in a cutting device.

An example of a fixturing system is illustrated in FIGS. 6a and 6b. FIG. 6a illustrates a composite 602, in the form of a helmet, in a first fixture 604. The fixture 604 may be attached to the drive 606 of the cutting device 608. As illustrated, the first fixture may be attached to the drive via a series of bolts 610, which may retain the fixture in a non-rotating manner with respect to the drive, i.e., as the drive rotates, so does the fixture. FIG. 6b illustrates a second fixture portion 620 positioned in contact with the composite 602. A clamping device 622 may be advanced into the fixture to retain the composite between the two fixtures 604 and 620. Pressure may be applied between the two fixturing devices 604, 620 by the clamping device 622. The clamping device 622 may freely-rotate on or with a support spindle 624 affixed to the machine base and the travel of the spindle 624 and/or the clamping device 622 may be adjusted relative to the first fixture 604.

Figure 7:
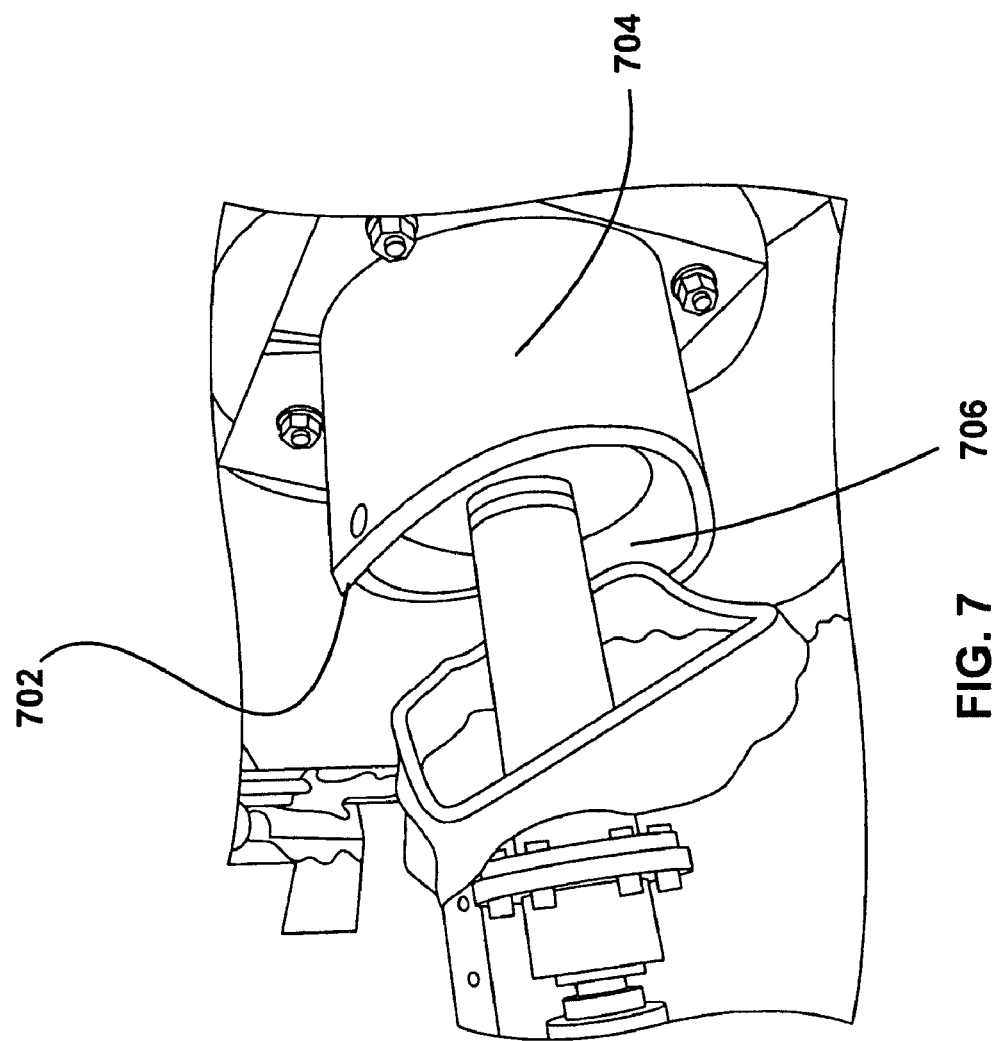
FIG. 7 is an example of a cutting path positioned relative to a fixture.

The fixtures may be formed of a metal or composite material. In one example, the fixture may be adhered to the composite surface. In addition, the fixture may be positioned or formed such that the edge or rim of the fixture is within 4 cm of the cutting path, including all values and increments in the range of 0.1 mm to 4 cm. An example of such offset is illustrated in FIG. 7, wherein the cutting path, illustrated by the trimmed edge 702 of the helmet, is set a relatively short distance from the edge of the first fixture portion 704 and the second fixture portion 706.

Once the composite has been positioned in the fixtures, a correct cutting path has been chosen and proper cooling of the gas supply tube has been reached, cutting may begin. It may be appreciated that in cutting by the process described herein, trimming or cutting of a composite article may occur as quickly as 7 mm per second, including all values and increments in the range of 0.1 mm per second to 7 mm per second, such as 5 mm per second to 7 mm per second. Cutting of the composite may also occur at either a constant rate or at a variable rate.

In addition, in cutting thermoplastic materials, or composites including thermoplastics materials the processes contemplated herein, it may be appreciated that the use of liquid $CO_2$ gas may reduce frictional heating caused by the cutting tool. Frictional heating may otherwise melt or deform thermoplastic materials. The $CO_2$ gas may cool the cutting tool and/or composite material sufficiently to present such frictional heating.

It may also be appreciated that in utilizing liquid $CO_2$ gas as a cooling medium certain advantages may be obtained over utilizing liquid $N_2$ or nitrous gas. For example, while an active exhaust system may still be required, $CO_2$ may be relatively cheaper. In addition, liquid $N_2$ gas or nitrous gas may cause excessive cooling, which may result in the composite or cutting tool becoming too brittle and breaking.

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:

1. A method for trimming a ballistic helmet, comprising:
    mounting a helmet having a near net shape in a fixture;
    providing a cutting tool having a cutting portion, wherein said cutting tool is displaceable in at least three axes relative to said fixture;
    supplying liquid $CO_2$ through a supply tube to said cutting portion of said cutting tool;
    cooling said supply tube to a first temperature; and
    cutting said helmet to a net shape with said cutting tool while supplying liquid $CO_2$.

2. A device for trimming a component:
    a fixture configured to support the component, wherein a first portion of said fixture is mounted on a drive and rotatable around a first axis and a second portion of said fixture, which is rotatable with said first portion and is displacable along said first axis with respect to said first portion;
    a cutting tool displaceable in at least 3 axes relative to said fixture by at least one motor;
    a programmable controller, wherein said controller communicates to said at least one motor and provides a cutting path, and said first and second portions of said fixture extend within 4 cm or less of said cutting path;
    a gas supply tube displaceable with said cutting tool; and
    a liquid gas tank in communication with said gas supply tube, wherein said device is configured to cut a composite material including at least 50% of fiber having a tenacity of greater than 15 grams per denier at a rate of up to 7 mm per second.

3. The device of claim 2, wherein said liquid gas tank includes liquid $CO_2$.

4. The device of claim 2, wherein said cutting rate is in the range of 5 mm per second to 7 mm per second.

5. The device of claim 2, wherein said first portion of said fixture includes a cavity for receiving the component.

6. The device of claim 2, wherein said second portion of said fixture is affixed to a clamping device that is freely rotatable.

* * * * *

UNITED STATES PATENT AND TRADEMARK OFFICE
CERTIFICATE OF CORRECTION

| | | |
|---|---|---|
| PATENT NO. | : 8,161,851 B1 | Page 1 of 1 |
| APPLICATION NO. | : 12/415393 | |
| DATED | : April 24, 2012 | |
| INVENTOR(S) | : Vasilios Brachos et al. | |

It is certified that error appears in the above-identified patent and that said Letters Patent is hereby corrected as shown below:

In column 6, line 42, in Claim 2, delete "displacable" and insert -- displaceable --, therefor.

Signed and Sealed this
Seventeenth Day of July, 2012

David J. Kappos
*Director of the United States Patent and Trademark Office*